(12) United States Patent
Cremiere

(10) Patent No.: US 10,279,897 B2
(45) Date of Patent: May 7, 2019

(54) AIRCRAFT FLIGHT CONTROL COLUMN DEVICE WITH FORCE-FEEDBACK HAVING AN EMERGENCY GROUP

(71) Applicant: Safran Electronics & Defense, Boulogne-Billancourt (FR)

(72) Inventor: Benoit Cremiere, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 301 days.

(21) Appl. No.: 15/509,739

(22) PCT Filed: Sep. 9, 2015

(86) PCT No.: PCT/EP2015/070561
§ 371 (c)(1),
(2) Date: Mar. 8, 2017

(87) PCT Pub. No.: WO2016/038069
PCT Pub. Date: Mar. 17, 2016

(65) Prior Publication Data
US 2017/0259915 A1    Sep. 14, 2017

(30) Foreign Application Priority Data

Sep. 9, 2014 (FR) .................................. 14 58458

(51) Int. Cl.
*B64C 13/46* (2006.01)
*B64C 27/56* (2006.01)
(Continued)

(52) U.S. Cl.
CPC ............. *B64C 27/56* (2013.01); *B64C 13/10* (2013.01); *B64C 13/46* (2013.01); *F16D 21/02* (2013.01);
(Continued)

(58) Field of Classification Search
CPC ................................ B64C 13/46; B64C 27/56
See application file for complete search history.

(56) References Cited

U.S. PATENT DOCUMENTS

| | | | |
|---|---|---|---|
| 2007/0119678 A1* | 5/2007 | Houle | ..................... F16D 21/06 192/69.8 |
| 2014/0027564 A1* | 1/2014 | Mercer | ................... B64C 27/56 244/17.13 |

FOREIGN PATENT DOCUMENTS

| | | |
|---|---|---|
| FR | 2970697 A1 | 7/2012 |
| GB | 2022034 A | 12/1979 |

OTHER PUBLICATIONS

International Search Report with English Translation dated Dec. 1, 2015, PCT Application No. PCT/EP2015/070561.
(Continued)

*Primary Examiner* — Richard G Davis
(74) *Attorney, Agent, or Firm* — Womble Bond Dickinson (US) LLP

(57) ABSTRACT

The invention relates to an aircraft flight control column device (1) comprising: a casing (2) for attaching to an aircraft structure; an output shaft (3) for connecting to a flight control column (56), the output shaft (3) being mounted such that it rotates in relation to the casing (2); a primary group (4) comprising a first torque-generating body (7, 8) for applying a first torque to the output shaft (3); a secondary group (5) comprising a second torque-generating body (7, 8) for applying a second torque to the output shaft (3); and a clutch for selectively connecting the primary group (4) and the secondary group (5) to the output shaft (3).

16 Claims, 7 Drawing Sheets

Figure 1:
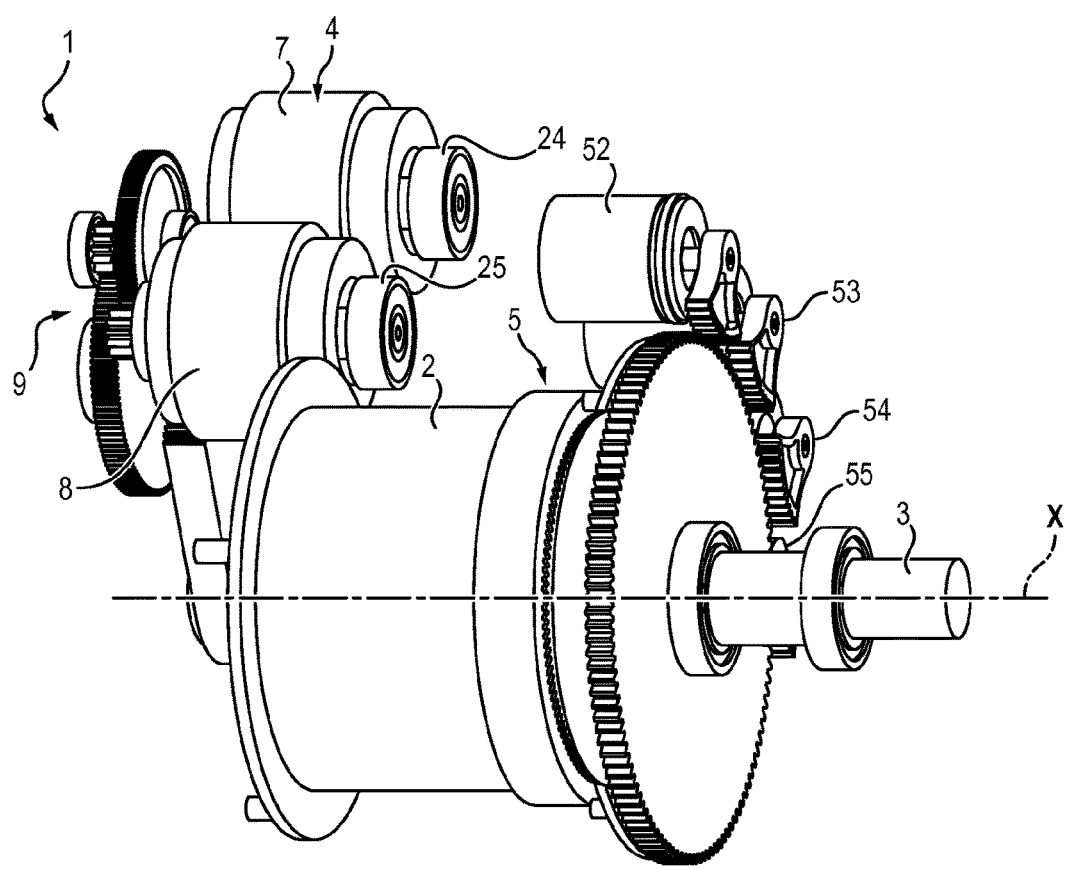

(51) Int. Cl.
- *B64C 13/10* (2006.01)
- *F16D 21/02* (2006.01)
- *F16D 27/108* (2006.01)
- *F16D 27/112* (2006.01)
- *F16D 27/12* (2006.01)

(52) U.S. Cl.
CPC .......... *F16D 27/108* (2013.01); *F16D 27/112* (2013.01); *F16D 27/12* (2013.01)

(56) References Cited

OTHER PUBLICATIONS

International Search Report and Written Opinion dated May 27, 2015, FR Application No. 1458458.

\* cited by examiner

AIRCRAFT FLIGHT CONTROL COLUMN DEVICE WITH FORCE-FEEDBACK HAVING AN EMERGENCY GROUP

FIELD OF THE INVENTION

The invention relates to an aircraft flight control stick. The device is a helicopter collective control stick, for example.

PRIOR ART

Helicopters are generally equipped with three flight controls operable by the pilot: a collective control stick, a cyclic control stick and the anti-torque pedals. The collective control stick makes it possible to alter collectively the incidence angle of the main rotor blades to cause climbing and descent, to accelerate or slow down the helicopter. The cyclic control stick makes it possible to modify cyclically the angle of incidence of the main rotor blades during rotation so as to create a different thrust at different points of the cycle, to incline the helicopter toward the front or toward the rear (pitch angle), or to one side or the other (roll angle). The anti-torque pedals make it possible to change the pitch of the auxiliary rotor blades serving to counteract the torque induced by the main rotor so as to cause the helicopter to turn (yaw angle) in hover.

Traditionally, in helicopters with hydraulic flight controls, the collective control stick is connected to hydraulic slide valves through a mechanical transmission (called "trim") located under the floor of the cockpit. The hydraulic slide valves control power actuators which control the orientation of the main rotor blades.

On the other hand, in helicopters with electrical flight controls, the collective control stick is not connected mechanically to the power actuators. For this type of control, there exist systems making it possible to generate force feedback on the control stick so that the pilot can feel a resistance force on the stick.

Currently, systems allowing force feedback to be generated are essentially passive mechanical systems, which do not allow dynamic reconfiguration of the behavior of the stick depending on the flight envelope. In other words, the force law felt by the pilot is always the same regardless of the conditions of flight.

It would be desirable to design active force feedback systems allowing modification of the force law felt by the pilot depending on flight conditions. In particular, it would be desirable, in complex flight situations, to apply a force law giving the pilot tactile sensations of the limits of the flight envelope, for example by preventing the pilot from moving the stick into extreme positions that could prove dangerous.

However, such force feedback systems are not currently implemented in helicopters, particularly due to the fact that these systems necessarily require the provision of motors, bringing about failure hazards. In this case, a motor failure would have the consequence of blocking the stick, which would potentially constitute a catastrophic event.

SUMMARY OF THE INVENTION

One aim of the invention is to propose an aircraft flight control stick device comprising a force feedback system, that does not cause blockage of the stick in the event of a system failure.

This problem is resolved within the scope of the present invention thanks to an aircraft flight control stick device, comprising:
- a casing intended to be attached to a structure of the aircraft,
- an output shaft intended to be connected to a flight control stick, the output shaft being mounted movable in rotation with respect to the casing,
- a primary path comprising a first torque-generating member capable of exerting a first torque on the output shaft,
- a secondary path comprising a second torque-generating member capable of exerting a second torque on the output shaft, and
- a clutch capable of selectively connecting the primary path and the secondary path to the output shaft.

Thus, in the event of a failure or of a jamming of a component of the primary path, the clutch makes it possible to connect the secondary path to the output shaft. In this manner, the secondary path takes over for the primary path.

The secondary path makes it possible to maintain the operation of the stick, despite a possible failure of the first torque-generating member on the primary path.

The device can further have the following characteristics:
- the clutch comprises a clutch part that is movable with respect to the casing between a first position in which the clutch part is engaged with the primary path and a second position in which the clutch part is engaged with the secondary path,
- the clutch comprises an electromagnet which, when it is energized, biases the clutch part toward the first position,
- the clutch comprises an elastic return member capable of biasing the clutch part toward the second position,
- the clutch part is movable in translation with respect to the casing,
- the output shaft is movable in rotation with respect to the casing along an axis of rotation, and the clutch part is movable in translation with respect to the casing parallel to the axis of rotation of the output shaft,
- the clutch part is mounted secured in rotation to the output shaft while being movable in translation with respect to the output shaft,
- the device comprises a flexible membrane by means of which the output shaft is connected to the clutch part,
- the first torque-generating member comprises at least one electric motor,
- the primary path comprises a reduction gear through which the electric motor exerts the first torque on the output shaft,
- the second torque-generating member is a friction system,
- the friction system comprises a drum and a cable in contact with the drum, the second torque being generated by friction between the cable and the drum when the drum is driven in rotation with respect to the cable,
- the cable is attached to the casing and the drum is rotationally mounted with respect to the casing,
- the second torque-generating member comprises an elastic element connecting the cable to the casing,
- the device comprises at least one position sensor capable of measuring an angular position of the output shaft and an electronic control unit capable of controlling the first torque-generating member depending on the measured angular position,
- the flight control stick is a helicopter collective stick.

PRESENTATION OF THE DRAWINGS

Figure 2:
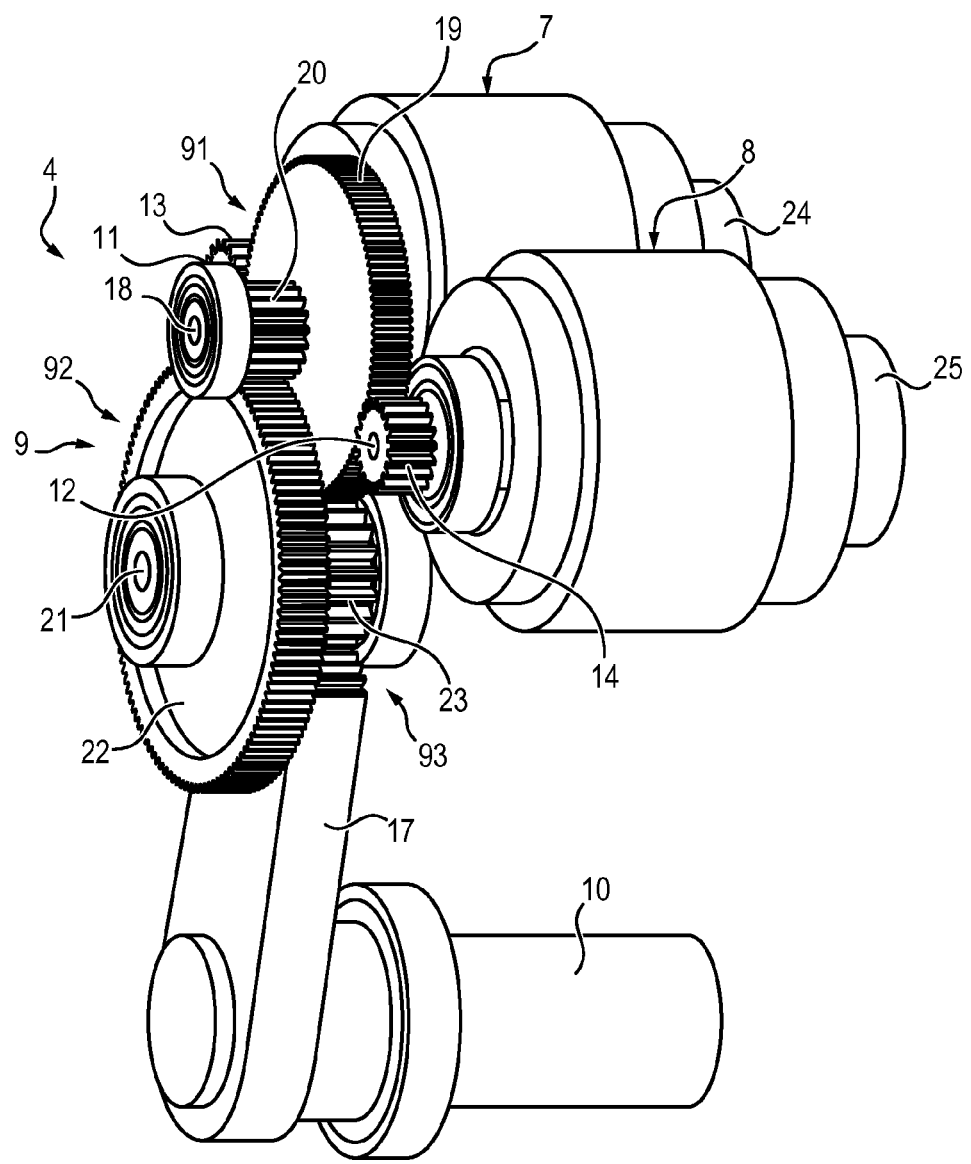
Figure 3:
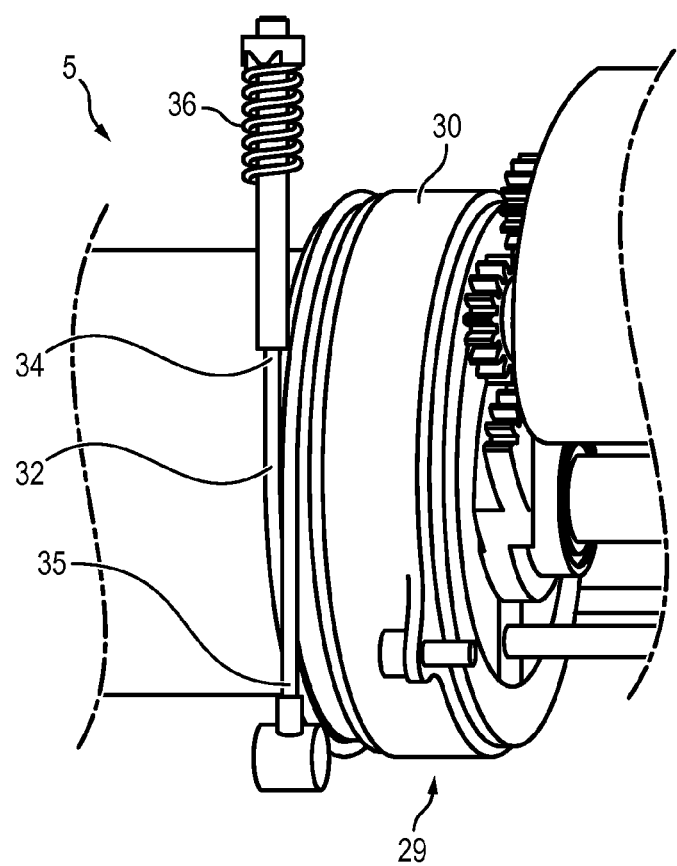
Figure 4:
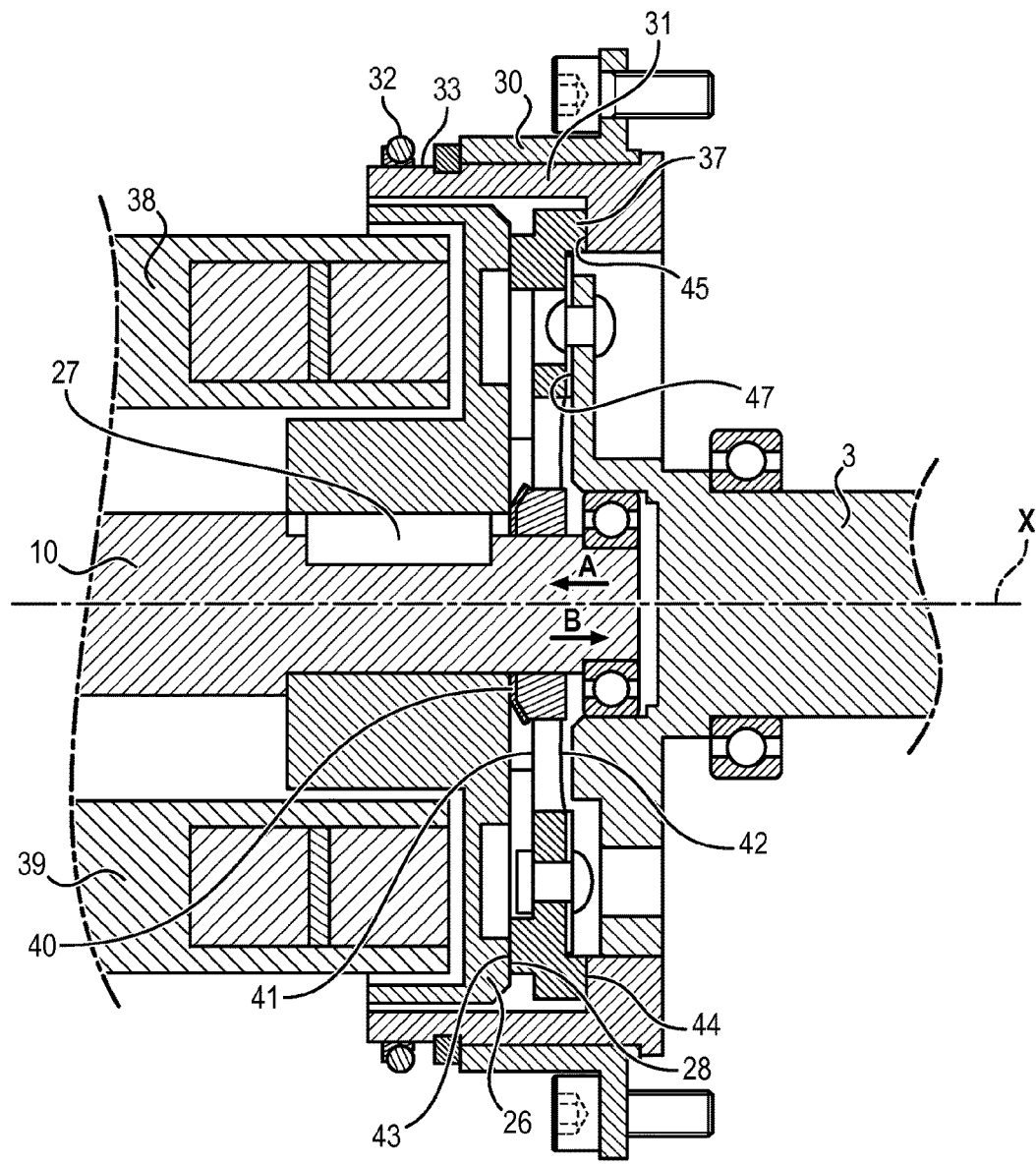
Figure 5A:
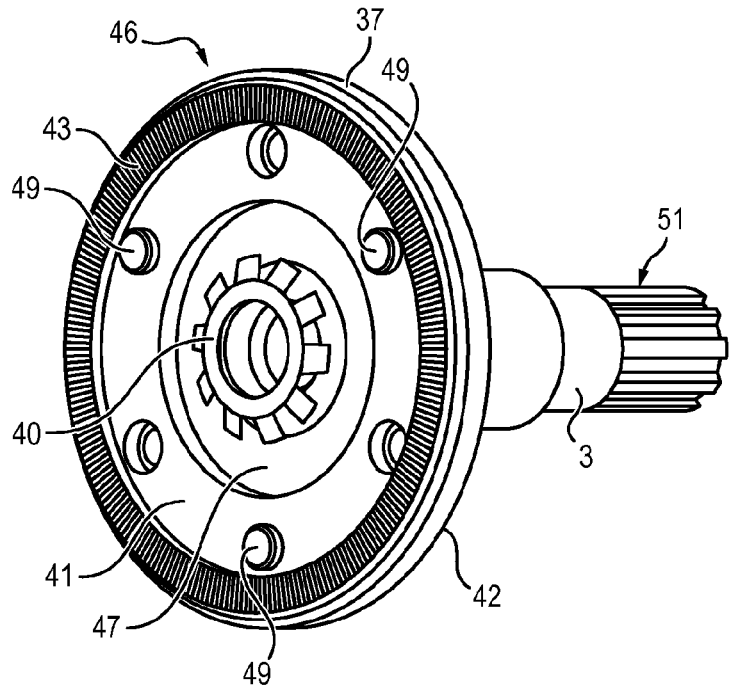
Figure 5B:
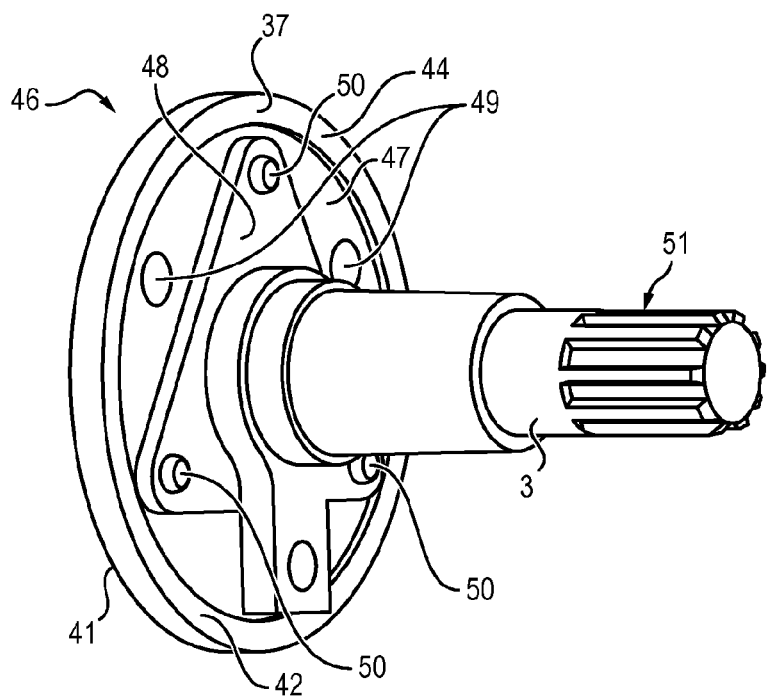
Figure 6:
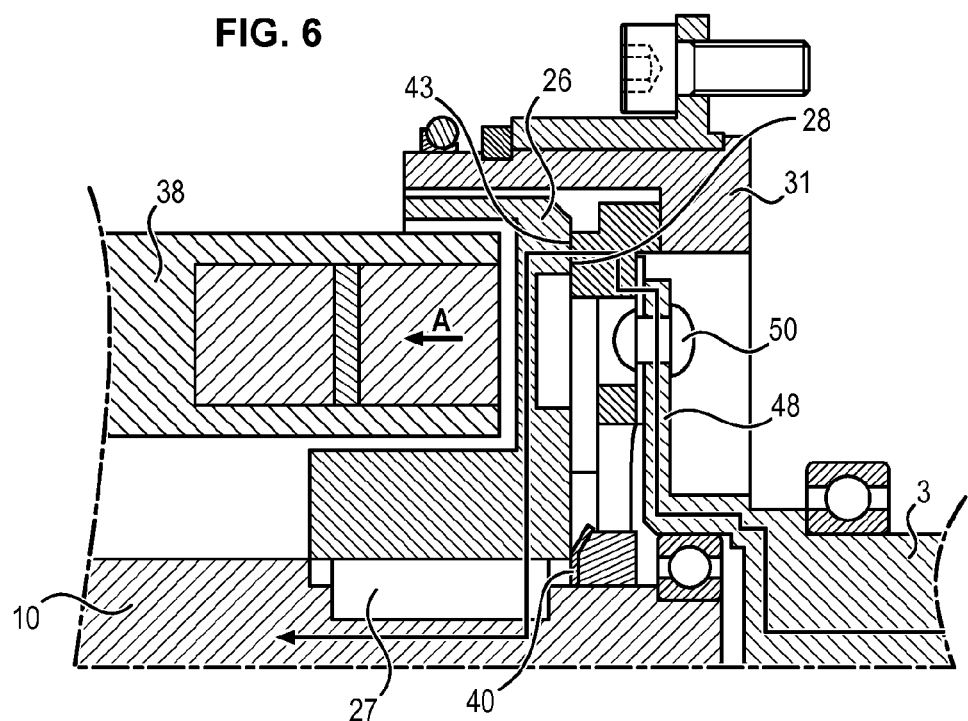
Figure 7:
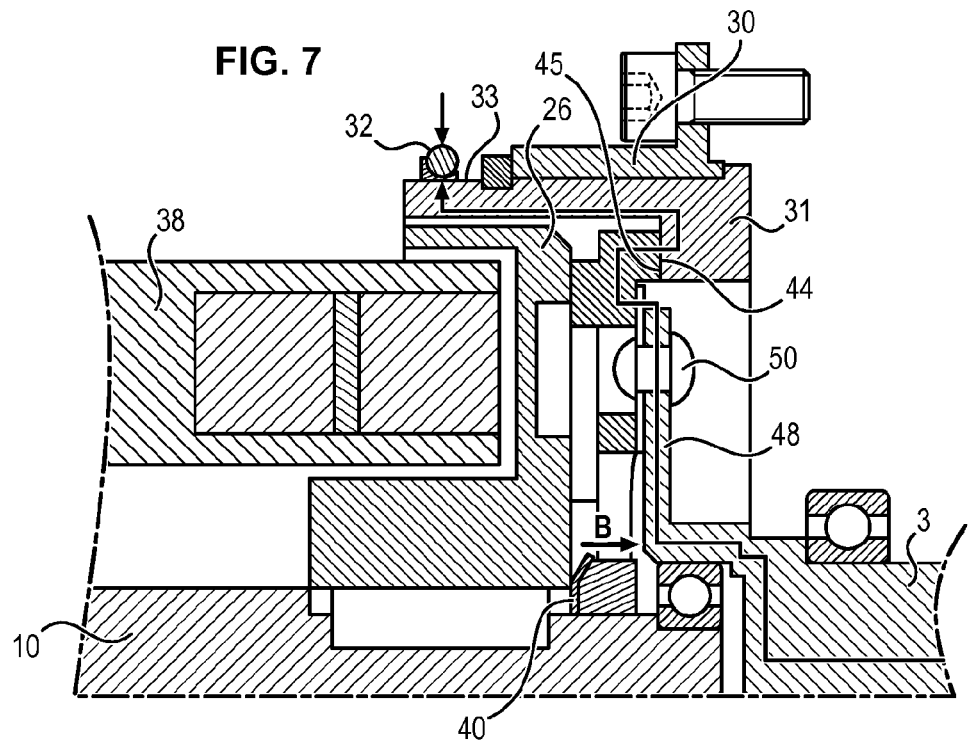
Figure 8:
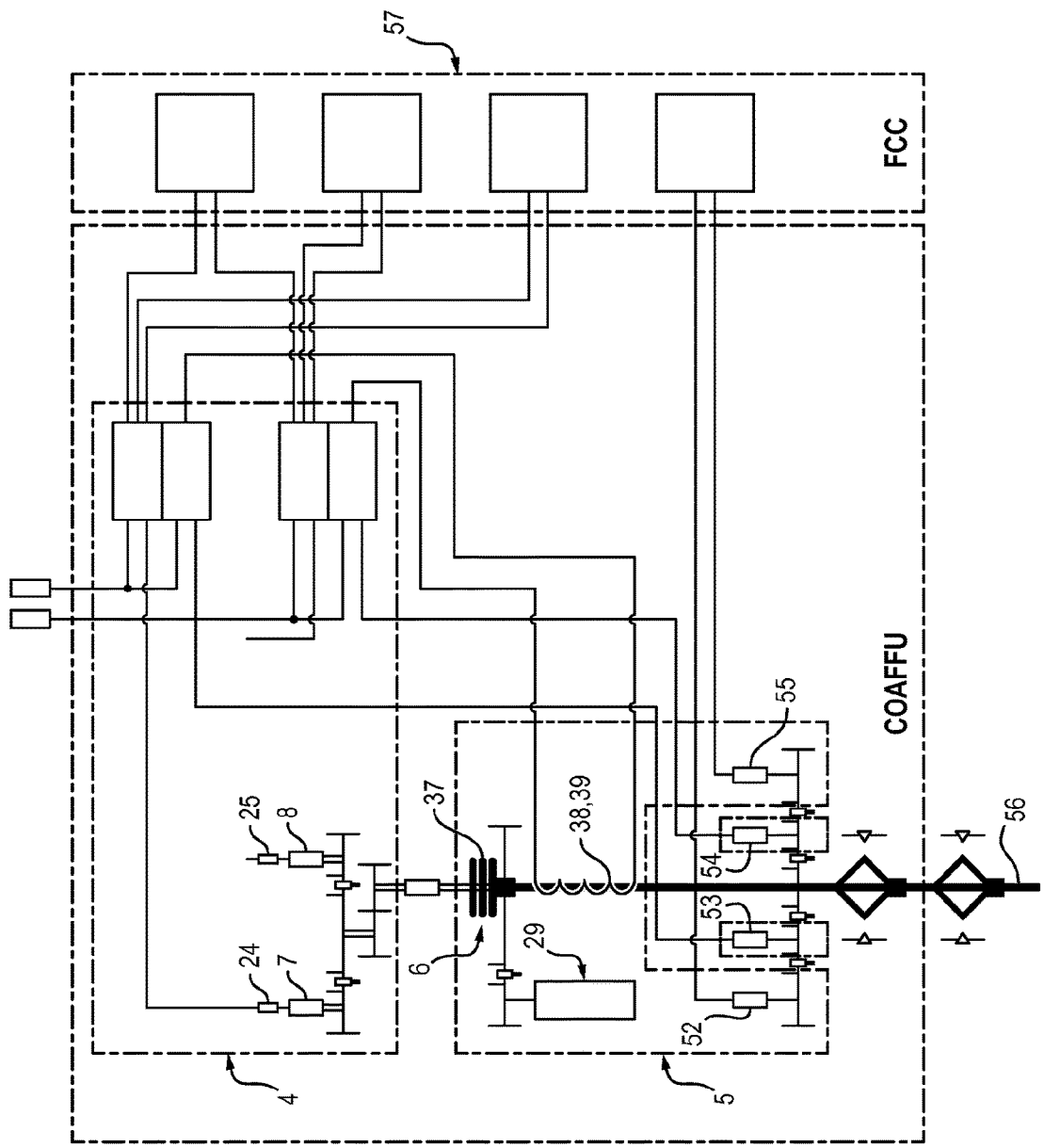

Other features and advantages will still appear from the description that follows, which is purely illustrative and not limiting and must be read with reference to the appended drawings, among which:

FIG. 1 shows schematically, in perspective, a flight control stick device according to an embodiment of the invention, FIG. 2 shows schematically, in perspective, components of the primary path of the device, FIG. 3 shows schematically, in perspective, components of the secondary path of the device, FIG. 4 shows schematically, in section, the clutch of the device, FIGS. 5A and 5B show schematically, in perspective, components of the clutch, FIG. 6 illustrates a force path through the clutch when the primary path is activated, FIG. 7 illustrates a force path through the clutch when the secondary path is activated, FIG. 8 is a diagram showing schematically different control elements of the device.

DETAILED DESCRIPTION OF AN EMBODIMENT

Referring to FIG. 1, the device 1 shown is a device for controlling a control stick, such as a helicopter collective stick for example.

The device 1 comprises a casing 2 and an output shaft 3 rotationally mounted with respect to the casing 2 along an axis of rotation X. The casing 2 is intended to be attached to a structure of the helicopter, such as the floor of the cockpit for example. The output shaft 3 is capable of being connected to the collective stick of the helicopter. The collective stick is intended to be operated by a pilot to control the collective pitch of the main rotor blades of the helicopter.

The stick is mounted secured in rotation to the output shaft 3, so that a rotation of the stick causes an identical rotation of the output shaft 3 around the axis X.

The device 1 comprises a force feedback system making it possible to apply a resistant force to the stick depending on the movement impressed on the stick by the pilot.

The force feedback system comprises a primary path 4 (or main path), a secondary path 5 (or emergency path) and a clutch 6 capable of selectively connecting the primary path 4 and the secondary path 5 to the output shaft 3.

The primary path 4 is shown in more detail in FIG. 2. The primary path 4 comprises a first electric motor 7, a second electric motor 8 mounted in parallel with the first electric motor 7, a reduction gear 9 and an output shaft 10.

The first electric motor 7 comprises a stator fixedly mounted with respect to the casing 2, a rotor movable in rotation with respect to the stator and an output shaft 11 mounted secured to the rotor.

Likewise, the second electric motor 8 comprises a stator fixedly mounted with respect to the casing, a rotor movable in rotation with respect to the stator and an output shaft 12 mounted secured to the rotor.

The reduction gear 9 is a reduction gear with three stages of reduction. The reduction gear 9 comprises a first stage 91, a second stage 92 and a third stage 93.

The first stage 91 of the reduction gear comprises a first input gear 13, a second input gear 14, a first intermediate shaft 18 rotationally mounted with respect to the casing 2 and a first intermediate gear 19.

The first input gear 13 is mounted secured in rotation to the output shaft of the first motor 7. The second input gear 14 is mounted secured in rotation to the output shaft of the second motor 8. The first intermediate gear 19 is mounted secured in rotation to the first intermediate shaft 18.

The second stage 92 of the reduction gear comprises a second intermediate gear 20, a second intermediate shaft 21 rotationally mounted with respect to the casing 2 and a third intermediate gear 22.

The second intermediate gear 20 is mounted secured in rotation to the first intermediate shaft 18. The third intermediate gear 22 is mounted secured in rotation to the second intermediate shaft 21.

The third stage 93 of the reduction gear comprises a fourth intermediate gear 23 and an output gear 17.

The fourth intermediate gear 23 is mounted secured in rotation to the second intermediate shaft 21. The output gear 17 is mounted secured to the output shaft 10.

Stages 91 to 93 are arranged so that both the first and second input gears 13 and 14 both mesh with the first intermediate gear 19, the second intermediate gear 20 meshes with the third intermediate gear 22 and the fourth intermediate gear 23 meshes with the output gear 17.

In this manner, the two electric motors 7 and 8 drive simultaneously in rotation the first intermediate gear 19 by means of the two input gears 13 and 14. The rotation of the first intermediate gear 19 is transmitted to the output gear 17 by means of the three reduction stages 91 to 93. The output gear 17 drives in rotation the output shaft 10 of the primary path.

The two input gears 13 and 14 are identical to one another. The first intermediate gear 19 has a diameter greater than the diameter of the input gears 13 and 14. Likewise, the third intermediate gear 22 has a diameter greater than the diameter of the second intermediate gear 20. Finally, the output gear 17 has a diameter greater than the diameter of the fourth intermediate gear 23. In this manner, the speed of rotation of the output shaft 10 is strongly reduced compared to the speed of rotation of the output shafts of the motors 7 and 8. The reduction ratio is approximately 120, for example.

Moreover, the primary path 4 comprises a first position sensor 24 and a second position sensor 25.

The first position sensor 24 is capable of measuring an angular position of the rotor of the first electric motor 7. The first position sensor 24 is for example an incremental coder comprising a rotating disk mounted secured in rotation to the rotor of the first electric motor 7. The first position sensor 24 is capable of generating a first position signal representing the angular position of the rotor with respect to the stator. This first signal is transmitted to the electronic control unit.

Likewise, the second position sensor 25 is capable of measuring an angular position of the rotor of the second electric motor 8. The second position sensor 25 is for example an incremental coder comprising a rotating disk mounted secured in rotation to the rotor of the second electric motor 8. The second position sensor 25 is capable of generating a second position signal representing the angular position of the rotor with respect to the stator. This second signal is transmitted to the electronic control unit.

In case of a breakdown or failure of one of the two electric motors 7 and 8, the other motor is capable, alone of driving in rotation the first intermediate gear 19 without the help of the failed motor.

The primary path 4 also comprises a disk 26 (visible in FIG. 4), the disk 26 being mounted secured in rotation to the output shaft 10 by means of a key 27. The disk 26 has a gear peripheral ring 28.

The secondary path 5 is shown in more detail in FIGS. 3 and 4. The secondary path 5 comprises a friction-generating system 29.

The friction-generating system 29 comprises a ring 30 fixedly mounted on the casing 2, a drum 31 rotationally mounted with respect to the casing 2 around the axis X, and a cable 32 in contact with the drum 31.

The ring 30 surrounds the drum 31 so as to guide the drum 31 in rotation.

The drum 31 has a cylinder-of-revolution outer surface 33 forming a friction surface.

The cable 32 surrounds the drum 31. More precisely, the cable 32 is wound around the friction surface 33 of the drum 31. The cable 32 has a first end 34 attached to the casing 2 and a second end 35 also attached to the casing 2.

The friction-generating system 29 comprises an elastic element 36 by means of which the first end 34 of the cable 32 is attached to the casing 2. The elastic element 36 is for example a tension spring capable of holding the cable 32 in tension around the drum 31.

The cable 32 is wound around the drum 31 so that, when the drum 31 is driven in rotation with respect to the casing 2, the friction surface 33 of the drum 31 rubs against the cable 32, consequently generating a friction torque opposing the rotation of the drum 31.

The clutch 6 is shown in FIG. 4. The clutch 6 comprises a clutch part 37, two electromagnets 38, 39 and an elastic return member 40.

The clutch part 37 has the shape of a disk. The clutch part 37 is movable in translation with respect to the casing 2 in a direction parallel to the axis X.

More precisely, the clutch part 37 is movable between a first position in which the clutch part meshes with the disk 26 of the primary path 4, and a second position in which the clutch part meshes with the drum 31 of the secondary path 5.

To this end, the clutch part 37 has a first face 41 and a second face 42, opposite the first face 41. The first face 41 of the clutch part 37 has teeth 43 capable of meshing with the teeth 28 of the disk 26 of the primary path 4. The second face 42 of the clutch part 37 has a friction surface 44 capable of meshing with a friction surface 45 of the drum 31 of the secondary path 5.

The electromagnets 38 and 39 are arranged so that, when they are activated, they generate a magnetic field biasing the clutch part 37 toward the first position.

The elastic return member 40, for its part, biases the clutch part 37 toward the second position. The elastic return member 40 is for example a spring positioned between the clutch part 37 and the disk 26 of the primary path 4.

Moreover, the device 1 comprises a connecting system 46 connecting the output shaft 3 of the device to the clutch part 37. The connecting system 46 is illustrated in more detail in FIGS. 5A and 5B. The connecting system 46 makes it possible for securely rotating the clutch part 37 and the output shaft 3 while allowing translation of the clutch part 37 with respect to the output shaft 3.

The connecting system 46 comprises a flexible membrane 47 positioned between the clutch part 37 and the output shaft 3, a connecting part 48 secured to the output shaft 3 and a plurality of attachment elements 49 and 50.

The attachment elements include first attachment elements 49 to attach the flexible membrane 47 to the clutch part 37 and second attachment elements 50 to attach the attachment part 48 to the flexible membrane 47.

In the example illustrated in FIGS. 6A and 6B, the flexible membrane 47 has a shape of a disk and the attachment elements 49, 50 are arranged at the periphery of the disk. The first attachment elements 49 are interposed between the second attachment elements 50.

Moreover, the connecting part 48 has a substantially triangular shape. The two attachment elements 50 are positioned in the corners of the triangle.

Due to its flexibility, the membrane 47 allows translation of the clutch part 37 with respect to the output shaft 3, parallel to the axis X.

The output shaft 3 has longitudinal splines 51 extending parallel to the axis X. The longitudinal splines 51 are capable of cooperating with complementary splines of the control stick to connect in rotation the output shaft 3 and the control stick.

The device 1 also comprises four position sensors 52 to 55 visible in FIG. 1, capable of measuring an angular position of the output shaft 3.

Each position sensor 52 to 55 is capable of generating a measurement signal representing the angular position of the stick. The signals generated by the sensors 52 to 55 are transmitted to the electronic control unit.

In normal operation, the clutch part 37 is initially in the second position.

During starting of the device 1, the electromagnets 38 and 39 are energized so that they bias the clutch part 37 toward the first position. The field created by the electromagnets 38 and 39 is sufficient to overcome the return force exerted by the return member 40 on the clutch part 37.

The clutch part 37 is displaced from the second position to the first position (arrow A).

The clutch part 37 engages with the disk 26 of the primary path 4 (FIG. 6). In this configuration, the force feedback applied to the control stick is generated by the primary path 4.

The electronic control unit controls the motors 7 and 8 depending on the measurement signals that it receives coming from the position sensors 52 to 55 and on flight parameters.

Each motor 7, 8 generates a reaction torque which is transmitted to the stick by means of a reduction gear 9 and the clutch 6.

In particular, the clutch part 37 transmits the reaction torque generated by the motors 7, 8 to the output shaft 3 of the device 1 via the flexible membrane 47.

In case of a failure of one of the motors 7 or 8, the other motor is adapted to generate the necessary reaction torque, without the help of the failed motor.

Moreover, in the event of failure of both motors 7 and 8, of the electronic control unit or interruption of electrical power supply, the clutch part 37 is automatically returned from the first position to the second position (FIG. 7).

In this configuration, the electromagnets 38 and 39 are no longer energized, so that they no longer bias the clutch part 37 toward the first position.

The clutch part 37 is displaced from the first position to the second position (arrow B) under the influence of the return force exerted by the return member 40 on the clutch part 37. The clutch part 37 is engaged with the drum 31 of the secondary path.

The force feedback applied to the control stick is generated by the secondary path 5.

The torque exerted on the stick by the pilot is transmitted to the drum 31 through the output shaft 3 of the clutch 6. The displacement of the stick causes rotation of the drum 31 with respect to the cable 32. The displacement of the drum 31 with respect to the cable 32 creates friction between the drum 31 and the cable 32, which has the effect of generating a resisting torque opposing the torque exerted by the pilot on the stick.

In this manner, in case of a breakdown or seizing of a component of the primary path 4, the clutch 6 makes it possible to connect the secondary path 5 to the output shaft 3 of the device 1. The secondary path 5 takes over for the primary path 4.

Moreover, the secondary path 5 does not require a supply of electrical power to operate.

FIG. 8 is a diagram showing schematically different control elements of the device 1.

As illustrated in this figure, the control stick 56 is connected selectively to the primary path 4 and to the secondary path 5 by means of the clutch 6.

The measurement signals coming from the sensors 24, 25, 52 to 55 are transmitted to the electronic control unit 57. The electronic control unit controls, on the one hand, the motors 7 and 8, and on the other hand the electromagnets 38 and 39, depending on the measurement signals that it receives.

The invention claimed is:

1. An aircraft flight control stick device, comprising:
   a casing intended to be attached to a structure of the aircraft,
   an output shaft intended to be connected to a flight control stick, the output shaft being mounted movable in rotation with respect to the casing,
   a primary path comprising a first torque-generating member capable of exerting a first torque on the output shaft,
   a secondary path comprising a second torque-generating member capable of exerting a second torque on the output shaft, and
   a clutch capable of selectively connecting the primary path and the secondary path to the output shaft.

2. The device according to claim 1, wherein the clutch comprises a clutch part movable with respect to the casing between a first position in which the clutch part is engaged with the primary path and a second position in which the clutch part is engaged with the secondary path.

3. The device according to claim 2, wherein the clutch comprises an electromagnet which, when it is energized, biases the clutch part toward the first position.

4. The device according to claim 2, wherein the clutch comprises an elastic return member capable of biasing the clutch part toward the second position.

5. The device according to claim 2, wherein the clutch part is movable in translation with respect to the casing.

6. The device according to claim 5, wherein the output shaft is movable in rotation with respect to the casing along an axis of rotation, and the clutch part is movable in translation with respect to the casing parallel to the axis of rotation of the output shaft.

7. The device according to claim 2, wherein the clutch part is mounted secured in rotation to the output shaft while being movable in translation with respect to the output shaft.

8. The device according to claim 2, comprising a flexible membrane by means of which the output shaft is connected to the clutch part.

9. The device according to claim 1, wherein the first torque-generating member comprises at least one electric motor.

10. The device according to claim 9, wherein the primary path comprises a reduction gear through which the electric motor exerts the first torque on the output shaft.

11. The device according to claim 1, wherein the second torque-generating member is a friction system.

12. The device according to claim 11, wherein the friction system comprises a drum and a cable in contact with the drum, the second torque being generated by friction between the cable and the drum when the drum is driven in rotation with respect to the cable.

13. The device according to claim 12, wherein the cable is attached to the casing and the drum is rotationally mounted with respect to the casing.

14. The device according to claim 12, wherein the second torque-generating member comprises an elastic element connecting the cable to the casing.

15. The device according to claim 1, comprising at least one position sensor capable of measuring an angular position of the output shaft and an electronic control unit capable of controlling the first torque-generating member depending on the measured angular position.

16. The device according to claim 1, wherein the flight control stick is a helicopter collective stick.

* * * * *